(12) United States Patent
Goldasz et al.

(10) Patent No.: US 9,163,694 B2
(45) Date of Patent: Oct. 20, 2015

(54) BI-STABLE SHOCK ABSORBER ASSEMBLY

(75) Inventors: Janusz Goldasz, Krakow (PL); Thomas W. Nehl, Shelby Township, MI (US)

(73) Assignee: BeijingWest Industries Co., Ltd., Beijing (CN)

( * ) Notice: Subject to any disclaimer, the term of this patent is extended or adjusted under 35 U.S.C. 154(b) by 176 days.

(21) Appl. No.: 13/511,004

(22) PCT Filed: Nov. 23, 2010

(86) PCT No.: PCT/US2010/057777
§ 371 (c)(1),
(2), (4) Date: Sep. 18, 2012

(87) PCT Pub. No.: WO2011/063385
PCT Pub. Date: May 26, 2011

(65) Prior Publication Data
US 2013/0001030 A1    Jan. 3, 2013

Related U.S. Application Data

(60) Provisional application No. 61/263,513, filed on Nov. 23, 2009.

(51) Int. Cl.
*F16F 9/46* (2006.01)

(52) U.S. Cl.
CPC ............ *F16F 9/464* (2013.01); *F16F 2222/06* (2013.01)

(58) Field of Classification Search
CPC ..... F16D 9/461; F16D 9/464; F16D 2222/06; F16D 9/14; F16D 9/16; F16D 9/18; F16D 9/19; F16D 9/34; F16D 9/3405; F16D 9/46; F16D 9/463

USPC .......... 188/266.1, 266.2, 266.5, 282.2, 282.3, 188/282.4
See application file for complete search history.

(56) References Cited

U.S. PATENT DOCUMENTS

| | | | | |
|---|---|---|---|---|
| 2,507,276 | A * | 5/1950 | Skwaryk | 188/282.2 |
| 3,256,960 | A * | 6/1966 | Casimir | 188/266.2 |
| 4,533,890 | A | 8/1985 | Patel | |
| 4,638,896 | A * | 1/1987 | Poyser | 188/266.2 |
| 4,650,042 | A | 3/1987 | Knecht et al. | |
| 4,653,617 | A * | 3/1987 | Casimir et al. | 188/282.5 |
| 4,660,686 | A * | 4/1987 | Munning et al. | 188/280 |
| 4,673,067 | A * | 6/1987 | Munning et al. | 188/266.4 |
| 4,928,028 | A | 5/1990 | Leibovich | |

(Continued)

FOREIGN PATENT DOCUMENTS

| | | |
|---|---|---|
| DE | 4109377 C1 * | 7/1992 |
| DE | 102005028850 B3 * | 12/2006 |

(Continued)

*Primary Examiner* — Thomas J Williams
(74) *Attorney, Agent, or Firm* — Dickinson Wright PLLC

(57) ABSTRACT

A shock absorber assembly including a fluid for absorbing forces between the body and the wheel of a motor vehicle. The shock absorber includes a valve having a resilient disc engaging a piston for impeding the passage of fluid through the aperture of the piston. A bi-stable solenoid is disposed in the housing and is interconnected with the resilient disc of the valve. The bi-stable solenoid's armature is moveable between a first stable position for applying a first biasing force against the resilient disc of the valve and a second stable position for applying a second biasing force being less than the first biasing force against the resilient disc of the valve. The adjustment of the biasing force on the valve also adjusts the damping force of the shock absorber.

10 Claims, 3 Drawing Sheets

(56) References Cited

U.S. PATENT DOCUMENTS

| | | | | |
|---|---|---|---|---|
| 4,973,854 A | * | 11/1990 | Hummel | 188/282.3 |
| 5,078,241 A | * | 1/1992 | Ackermann et al. | 188/282.6 |
| 5,133,434 A | * | 7/1992 | Kikushima et al. | 188/282.1 |
| 5,507,371 A | | 4/1996 | Takahashi | |
| 8,228,149 B2 | * | 7/2012 | Puth et al. | 335/229 |
| 8,678,148 B2 | * | 3/2014 | Piotrowski et al. | 188/282.2 |
| 2004/0112694 A1 | * | 6/2004 | Spicer et al. | 188/282.2 |
| 2005/0046531 A1 | * | 3/2005 | Moyer et al. | 335/256 |

FOREIGN PATENT DOCUMENTS

| | | | |
|---|---|---|---|
| EP | 0392784 B1 | | 12/1993 |
| GB | 1128249 A | * | 9/1968 |
| GB | 2190461 A | * | 11/1987 |
| JP | 06207636 A | * | 7/1994 |
| WO | WO 2009109444 A1 | * | 9/2009 |

* cited by examiner

BI-STABLE SHOCK ABSORBER ASSEMBLY

CROSS REFERENCE TO RELATED APPLICATIONS

This application claims priority to International Patent Application No. PCT/US2010/057777 filed on Nov. 23, 2010, entitled "Bi-Stable Solenoid Shock Absorber Assembly" and U.S. Provisional Application No. 61/263,513 filed on Nov. 23, 2009 entitled "Hydraulic Damper".

BACKGROUND OF THE INVENTION

1. Field of the Invention

A shock absorber assembly including a fluid for absorbing forces between a first component and a second component 2. Description of the Prior Art Motor vehicles generally include a suspension system having a shock absorber, also known as a damper, for absorbing forces between the frame and the wheel assembly of the vehicle. Most shock absorbers have a cylindrically shaped housing extending along an axis and presenting an open interior. A piston is slidably disposed in the housing to divide the open interior into a compression chamber on one side of the piston and a rebound chamber on the other side of the piston. A rod engaging the piston extends through the piston housing for attachment to either the frame or the wheel assembly of the vehicle, and the housing is attached to the other of the frame or the wheel assembly. The piston presents a plurality of apertures for conveying a fluid in the housing between the rebound and compression chambers in response to movement of the wheel assembly relative to the frame. Because the fluid must pass through the small apertures of the piston, a damping force is developed by the shock absorber to resist movement of the wheel assembly relative to the frame of the vehicle.

Various methods have been developed for adjusting the damping force of shock absorbers to affect the dynamic characteristics of the vehicle. One example of such an adjustable shock absorber is shown in U.S. Pat. No. 5,507,371, issued to Koukichi Takahashi on Apr. 16, 1996 ("Takahashi '371"). Takahashi '371 shows an adjustable shock absorber including a valve on one side of the piston that deforms in a deflecting manner to impede the flow of fluid through the apertures of the piston. A spring is disposed on the other side of the damping valve to exert a biasing force on the damping valve. The spring is linked to an actuating rod for adjusting the biasing force being exerted by the spring on the damping valve. An adjustment of the biasing force against the damping valve also changes the damping force of the shock absorber. There remains a continuing need for improved adjustable shock absorbers.

SUMMARY OF THE INVENTION

The present invention is for a shock absorber assembly including a fluid for absorbing forces between a first component and a second component. The shock absorber assembly includes a valve engaging a piston for impeding the passage of fluid through an aperture in the piston. A bi-stable solenoid is disposed in the housing and is interconnected with the valve. The bi-stable solenoid features an armature that is moveable between a first stable position for applying a first biasing force against the valve and a second stable position for applying a second biasing force being less than the first biasing force against the resilient disc of the valve (or vice and versa). Adjusting the biasing force on the valve also adjusts the damping force of the shock absorber. Thus, the operator of the vehicle has the ability to choose between a hard (high force) damping setting (with the solenoid's armature in the first stable position) and a soft (low force) damping setting (with the solenoid's armature in the second stable position). The damping setting can be switched between the high and low settings on the fly with the simple flip of a switch.

The subject shock absorber assembly is also advantageous when compared to the prior art. Generally, the device's response is fast and it consumes very little energy. Specifically, all that is required to adjust the shock absorber from the high force damping setting to the low force damping setting is a short pulse of electrical current. Another short pulse of (reversed) electrical current reverts the shock absorber back to the high force damping setting. Advantageously, a constant supply of current is not required to maintain the bi-stable solenoid in either of the stable positions.

Also advantageously, the bi-stable solenoid system is compact and fits within the housing of the shock absorber. With minor adjustments to the geometry of the housing, the shock absorber can be installed onto any pre-existing suspension system. The bi-stable solenoid also latches very strongly into the first and second stable positions. Therefore, the shock absorber assembly is resistant to undesirable and accidental damping settings changes.

Moreover, the valve and bi-stable solenoid can be used in combination with other valving controls for adjusting the damping force of the shock absorber. Finally, no sophisticated controls are required to adjust the damping setting of the shock absorber. All that is required to adjust the damping force of the shock absorber assembly is a short pulse of electrical current generated in such a way to cancel the latching force of the bi-stable solenoid assembly. Thus, the shock absorber can be manufactured cheaply without the need for an expensive and complicated controller.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
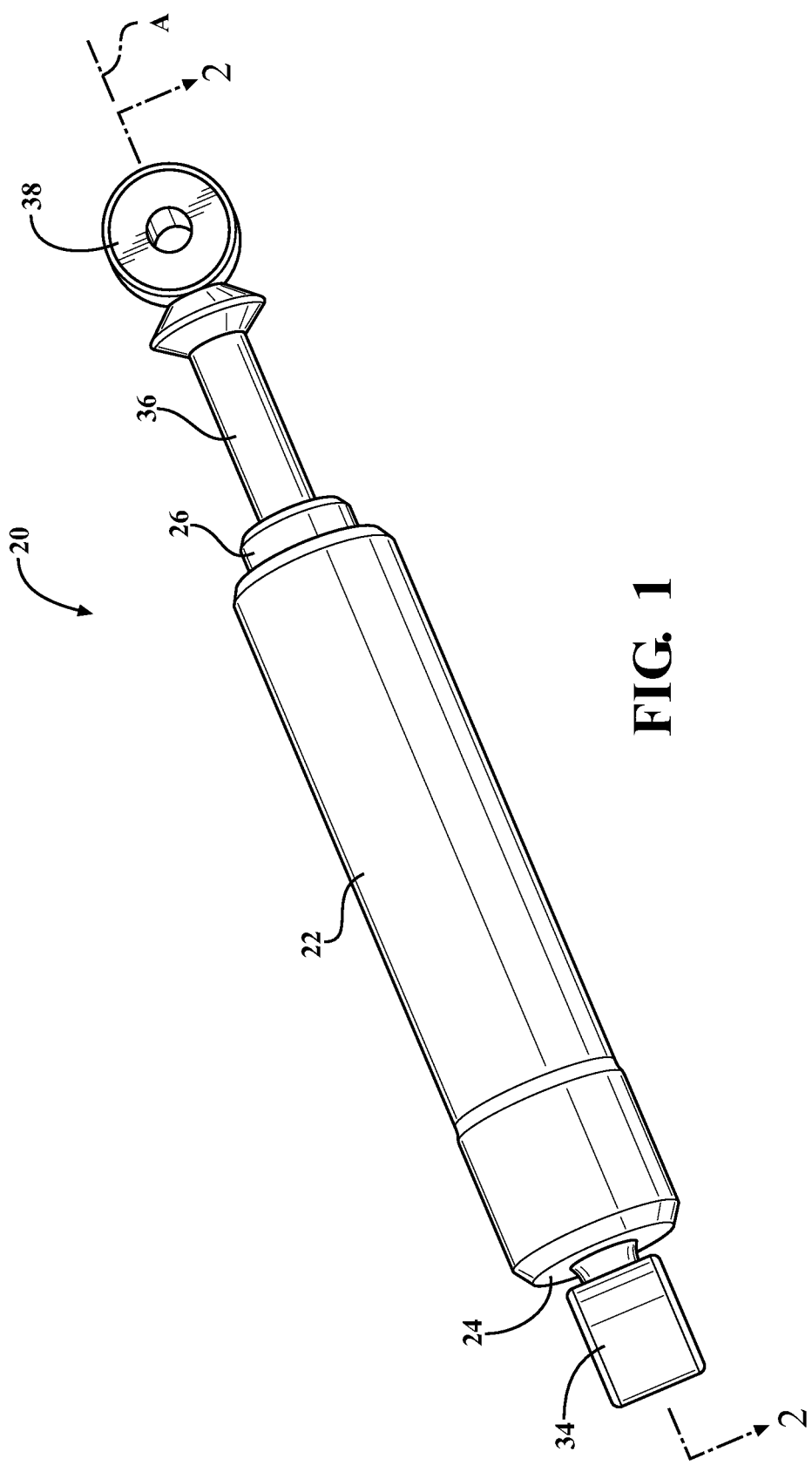
FIG. 1 is a perspective view of a first exemplary embodiment of the subject invention.

Referring to the Figures, wherein like numerals indicate corresponding parts throughout the several views, a shock absorber assembly 20 for absorbing forces between a first component and a second component is generally shown in FIG. 1. Although shown in the drawings as being a mono-tube shock absorber, it should be appreciated that all of the exemplary embodiments could be used in a twin-tube shock absorber. The shock absorber could be used in many different applications, including but not limited to a motor vehicle, an all-terrain vehicle, or a snowmobile.

Figure 2:
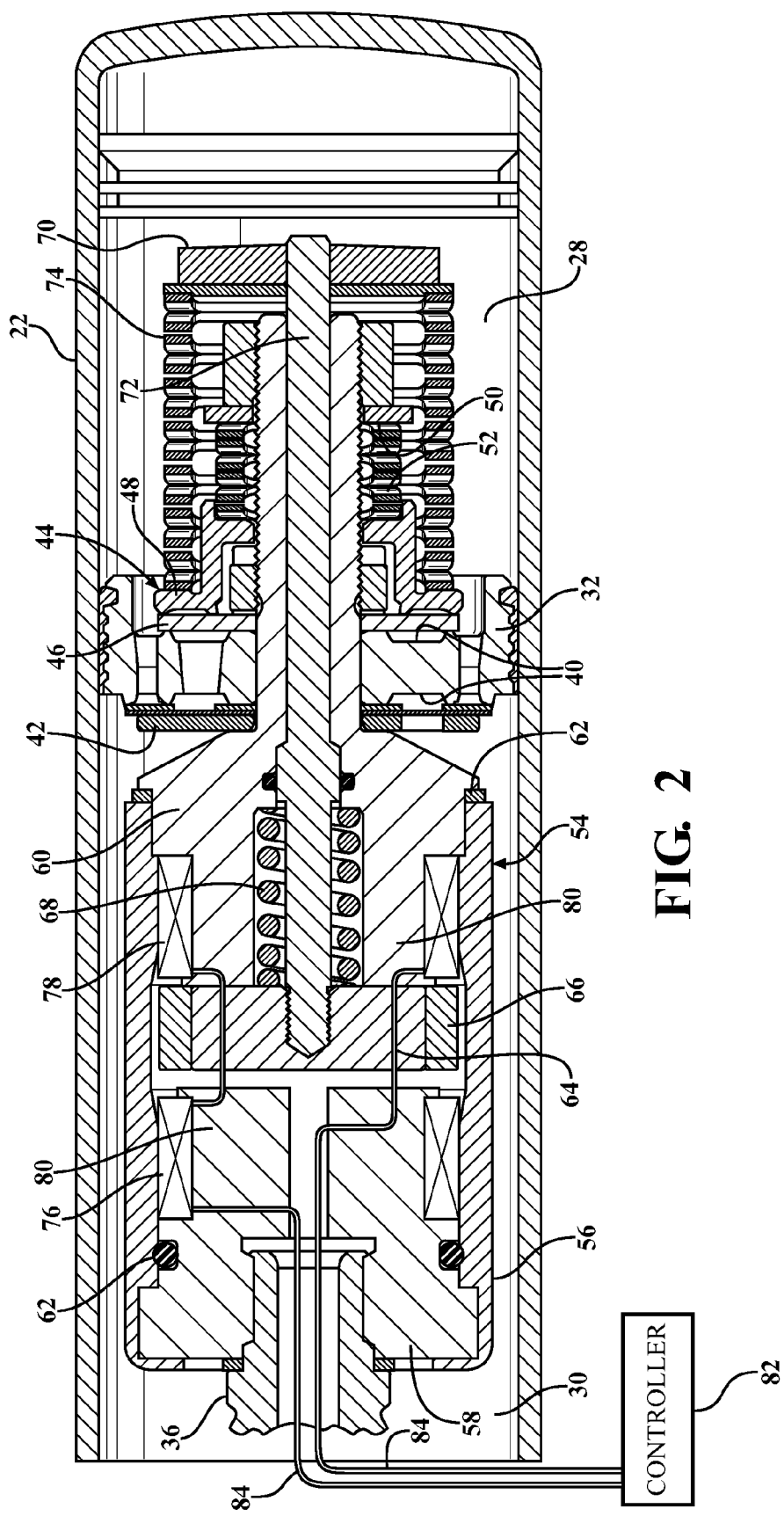
FIG. 2 is a cross-sectional view of the first exemplary embodiment taken along line 2-2 of FIG. 1.

FIG. 2 is a cross-sectional view of a first exemplary embodiment of the shock absorber assembly 20. The first exemplary embodiment includes a housing 22 having a cylindrical shape and extending along an axis A from a first housing end 24 to a second housing end 26 and presenting an open interior 28, 30. An oil is preferably disposed in the interior of the housing 22, though any other fluid may alternatively be used.

A piston 32 is slidably disposed in the open interior 28, 30 of the housing 22 for sliding in an axial direction. The piston 32 divides the open interior 28, 30 of the housing 22 into a compression chamber 28 on one side of the piston 32 and a rebound chamber 30 on the other side of the piston 32.

A first connector 34 is disposed on the first housing end 24 for attachment to the first component, e.g. the frame of an automobile. A rod 36 interconnected with the piston 32 extends along the axis A through the second housing end 26 to a second connector 38 for attachment to the second component, e.g. the wheel assembly of an automobile.

The piston 32 presents a plurality of apertures 40 for conveying the oil through the piston 32 between the compression and rebound chambers 28, 30 in response to movement of the second component (wheel assembly) relative to the first component (frame). A compression resilient disc stack 42 is disposed in the rebound chamber 30 of the housing 22 and abutting the piston 32 for impeding the flow of oil through the apertures 40 of the piston 32 from the compression chamber 28 to the rebound chamber 30 during a compression stroke of the piston 32. During the compression stroke of the piston 32, the pressure of the oil in the compression chamber 28 increases relative to the rebound chamber 30. The compression resilient disc(s) 42 are preferably formed of a resilient material for deflecting to allow the oil to flow through the apertures 40 only in response to a threshold pressure difference between the oil in the compression chamber 28 and the rebound chamber 30.

The first exemplary embodiment further includes a valve 44, generally indicated, disposed in the compression chamber 28 of the housing 22. The valve 44 includes a rebound resilient disc stack 46 abutting the piston 32 in the compression chamber 28 for impeding the flow of oil through the apertures 40 of the piston 32 from the rebound chamber 30 to the compression chamber 28 during the rebound stroke of the piston 32. Like the compression resilient disc stack 42, the rebound resilient disc(s) 46 are also formed of a resilient material. During the rebound stroke of the piston 32, the pressure of the oil in the rebound chamber 30 increases relative to the compression chamber 28. The rebound resilient discs 46 deflect to allow oil to flow through the apertures 40 only in response to a threshold pressure difference between the oil in the rebound chamber 30 and the compression chamber 28 being reached.

The valve 44 further includes first spring seat 48 abutting the rebound resilient disc 46 and a second spring seat 50 spaced axially from the piston 32. A valve spring 52 extends between the first and second spring seats 48, 50 for applying a constant biasing force against the first spring seat 48. The first spring seat 48 transfers this biasing force to the rebound resilient disc 46. The constant biasing force on the rebound resilient disc 46 makes it more difficult for the rebound resilient disc 46 to deflect, and thus, a greater pressure difference between the oil in the rebound and compression chambers 30, 28 is required for the resilient disc to deflect and allow oil to flow from the rebound chamber 30 to the compression chamber 28.

A bi-stable solenoid 54, generally indicated, is disposed in the housing 22 for imparting an additional and adjustable biasing force on the rebound resilient disc 46 to adjust the damping force of the shock absorber assembly 20. In the first exemplary embodiment, the bi-stable solenoid 54 includes a sleeve 56 having a cylindrical shape and disposed in the rebound chamber 30 of the housing 22 between the second housing end 26 and the piston 32. A first core 58 is disposed in the sleeve 56 and engages the rod 36 for interconnecting the sleeve 56 and the rod 36. A second core 60 is disposed in the sleeve 56 and spaced axially from the first core 58. The second core 60 engages the piston 32 for interconnecting the sleeve 56 and the piston 32. The first and second cores 58, 60 are preferably made of soft magnetic materials, e.g. various low-carbon steel grades, silicon steel grades or other non-permanently magnetized materials.

At least one seal 62 is disposed between the sleeve 56 and the first core 58, and at least one seal 62 is disposed between the sleeve 56 and the second core 60. The seals 62 prevent the oil from entering the sleeve 56.

An armature 64 having a generally cylindrical shape is slidably disposed within the sleeve 56 between the first and second cores 58, 60. As will be discussed in further detail below, the armature 64 is moveable between a first stable position abutting the first core 58 and a second stable position—shown in FIG. 2—abutting the second core 60. In the exemplary embodiment, a permanent magnet 66 having a generally annular shape is disposed along the circumference of the cylindrical armature 64 for magnetically attracting the armature 64 to the first and second cores 58, 60. Alternatively, the entire armature could be made of a permanently magnetic material, or a plurality of smaller permanent magnets contained within a sleeve (not shown) disposed along the circumference of the armature.

The bi-stable solenoid 54 of the first exemplary embodiment further includes a first armature spring 68 extending from the second core 60 to the armature 64 for biasing the armature 64 against the first core 58. A third spring seat 70 is disposed in the compression chamber 28 and spaced from the second spring seat 50. A spindle 72 extends through the piston 32 and second core 60 to interconnect the third spring seat 70 and the armature 64. A second armature spring 74 extends between the third spring seat 70 and the first spring seat 48 to bias the armature 64 against the second core 60. The second armature spring 74 also imparts an adjustable biasing force against the first spring seat 48 and the rebound resilient disc 46.

The spindle 72 moves the third spring seat 70 in response to the armature 64 moving between the first and second stable positions. Movement of the third spring seat 70 affects the compression of the second armature spring 74, which consequently affects the adjustable biasing force of the second armature spring 74 on the first spring seat 48 and the rebound resilient disc 46. When the armature 64 is in the first stable position abutting the first core 58, the second armature spring 74 is compressed to apply a first biasing force against the first spring seat 48. The first biasing force makes it more difficult for the rebound resilient disc 46 to deflect and allow the oil to flow through the piston 32 into the compression chamber 28. When the armature 64 is in the second stable position abutting the second core 60 (shown in FIG. 2), the compression of the second armature spring 74 is relieved when compared to the first stable position. In the second stable position, the second armature spring 74 applies a second biasing force that is less than the first biasing force against the first spring seat 48 and the rebound resilient disc 46. Thus, when the armature 64 is in the second stable position, the shock absorber assembly 20 has a lower damping force compared to the first stable position.

The bi-stable solenoid 54 further includes a first coil 76 disposed in the first core 58 and a second coil 78 disposed in the second core 60. The first and second coils 76, 78 are connected in series to one another and are each wound in the same direction. In order to electrically connect the first and second coils 76, 78, a plurality of electrical connections 80 extend through the armature 64 between the first and second coils 76, 78.

A controller 82 is electrically connected to the circuit incorporating the first and second coils 76, 78 for selectively outputting a positive current or a negative current. A pair of wires 84 run through the rod 36 to electrically connect the controller 82 to the coils 76, 78.

In operation, the armature 64 starts, for example, in the first stable position with the armature 64 abutting the first core 58. When the armature 64 is in the first stable position, the second armature spring 74 applies a first biasing force against the first spring seat 48 and the rebound resilient disc 46. To move the armature 64 to the second stable position, which is shown in FIG. 2, the controller 82 outputs a short pulse of either a positive current or a negative current, depending on the winding of the first and second coils 76, 78. Upon the application of a short current pulse, the first coil 76 creates an electromagnetic field that temporarily overrides, or cancels, the magnetic field of the permanent magnet assembly 66 latching the armature 64 to the first core 58. Without the magnetic field of the permanent magnet assembly 66, the first armature spring 68 applies a force on the armature 64 to move the armature 64 in an axial direction toward the second core 60. Once the armature 64 gets close to the second core 60 through the central neutral (middle) position, a magnetic attraction develops between the permanent magnet assembly 66 and the second core 60 to pull the armature 64 into the second stable position abutting the second core 60. When the armature 64 moves to the second stable position, the third spring seat 70 also moves axially to expand the second armature spring 74. The second armature spring 74 imparts a second biasing force, which is less than the first biasing force, against the first spring seat 48 and the rebound resilient disc 46.

To move the armature 64 back to the first stable position, another short pulse of the current is applied to the coils 76, 78. If a positive current was used to move the armature 64 from the first stable position to the second stable position, then negative current will be needed to move the armature 64 back to the first stable position. Again, upon the application of this short pulse of current, the second coil 78 develops another temporary electromagnetic field that temporarily overrides, or cancels, the magnetic field of the permanent magnet assembly 66 latching the armature 64 to the second core 60. Without this magnetic attraction, the second armature spring 74 applies a force on the armature 64 to move the armature 64 in an axial direction toward the first core 58 through the central neutral (middle) position. Once the armature 64 gets close enough to the first core 58, a magnetic attraction develops between the armature 64 and the first core 58 to pull the armature 64 into the first stable position abutting the first core 58. When the armature 64 moves back to the first stable position, the third spring seat 70 also moves axially so that the second armature spring 74 compresses to impart the first biasing force against the first spring seat 48 and the rebound resilient disc 46.

The bi-stable solenoid 54 provides a quick way to adjust the position of the third spring seat 70, and thus, the biasing force of the second armature spring 74 against the rebound resilient disc 46 of the valve 44. With only a short burst of current, the performance of the shock absorber assembly 20 can be changed from a high damping force setting with the armature 64 in the first position to a low damping force setting with the armature 64 in the second position. Once the armature 64 is in either the first stable position or the second stable position, no further current-induced magnetic field is required to hold the armature 64 in place.

Figure 3:
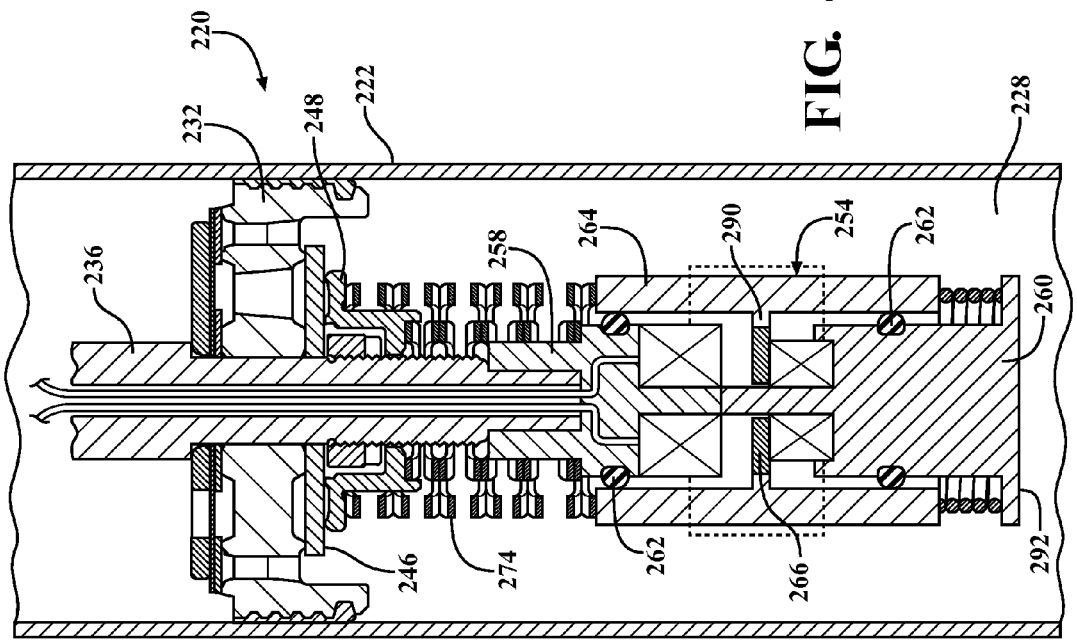
FIG. 3 is a cross-sectional view of a second exemplary embodiment.

A second exemplary embodiment of the shock absorber assembly 120 is generally shown in FIG. 3. The bi-stable solenoid 154, generally indicated, of the second exemplary embodiment is disposed in the compression chamber 128 of the housing 122. The rod 136 of the second exemplary embodiment directly engages the piston 132 for moving with the piston 136. The armature 164 is cylindrically shaped and presents an armature flange 190 extending radially inwardly and disposed axially between the first and second cores 158, 160. At least one seal 162 is disposed between the cylindrical sides of the armature 164 and each of the cores 158, 160 for restricting the oil from entering the cylindrical armature 164. An annularly shaped permanent magnet 166 is disposed on the armature flange 190 for magnetically attracting the armature 164 to the first and second cores 158, 160.

The first armature spring 168 is disposed between the armature flange 190 and the second core 160 for biasing the armature 164 against the first core 158, and the second armature spring 174 extends from the armature 164 to the first spring seat 148 for biasing the armature 164 against the second core 160 and for biasing the first spring seat 148 and the rebound resilient disc 146 against the piston 132.

Similar to the first embodiment, the armature 164 of the second exemplary embodiment is moveable between a first stable position with the armature flange 190 abutting the first core 158 and a second stable position with the armature 164 abutting the second core 160. When the armature 164 is in the first stable position, the second armature spring 174 exerts a first biasing force against the first spring seat 148 and the rebound resilient disc 146, and when the armature 164 is in the second stable position, the second armature spring 174 exerts a second biasing force that is less than the first biasing force against the first spring seat 148 and the rebound resilient disc 146.

Figure 4:
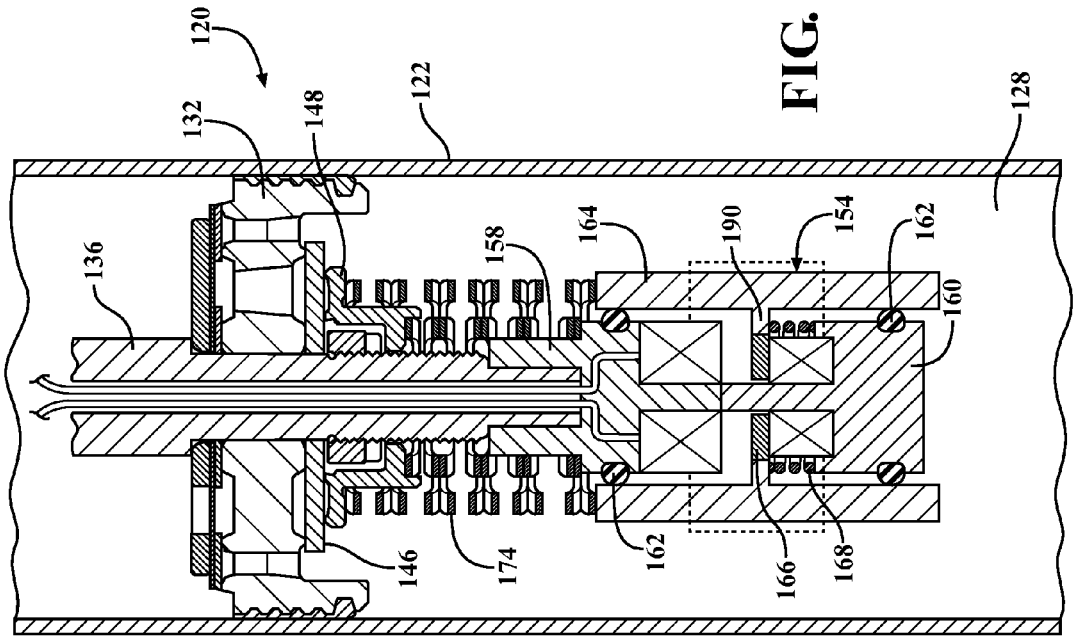
FIG. 4 is a cross-sectional view of a third exemplary embodiment.

A third exemplary embodiment of the shock absorber assembly 220 is generally shown in FIG. 4. Similar to the second exemplary embodiment, the bi-stable solenoid 254, generally indicated, of the third exemplary embodiment is disposed in the compression chamber 228 of the housing 222. The rod 236 of the third exemplary embodiment directly engages the piston 232 for moving with the piston 232. In the third exemplary embodiment, the armature 264 is cylindrically shaped and presents an armature flange 290 extending radially inwardly and disposed axially between the first and second cores 258, 260. At least one seal 262 is disposed between the armature 264 and each of the cores 258, 260 for restricting the oil from entering the cylindrical armature 264. At least one permanent magnet 266 is disposed on the armature flange 290 of the second exemplary embodiment for magnetically attracting the armature 264 to the first and second cores 258, 260.

The first core 258 of the third exemplary embodiment presents a first core flange 292 extending radially outwardly. The first armature spring 268 is disposed between the first core flange 292 and the armature 264 for biasing the armature 264 against the first core 258, and the second armature spring 274 extends from the armature 264 to the first spring seat 248 for biasing the armature 264 against the second core 260 and for biasing first spring seat 248 and the rebound resilient disc 246 against the piston 232.

The armature 264 of the third exemplary embodiment is moveable between a first stable position with the armature flange 290 abutting the first core 258 and a second stable position with the armature 264 abutting the second core 260. When the armature 264 is in the first stable position, the second armature spring 274 exerts a first biasing force against the first spring seat 248 and the rebound resilient disc 246, and when the armature 264 is in the second stable position, the second armature spring 274 exerts a second biasing force that is less than the first biasing force against the first spring seat 248 and the rebound resilient disc 246.

All of the exemplary embodiments show the permanent magnet 66, 166, 266 as being disposed on the armature 64, 164, 264 of the bi-stable solenoid 54, 154, 254. However, it should be appreciated that the permanent magnets could alternatively be disposed on the first and second cores of the bi-stable solenoid. In such a bi-stable solenoid system, the armature would then be made of a soft magnetic material, e.g. various grades of low-carbon steel.

Also, all of the exemplary embodiments show a valve incorporating two parallel springs of which one always provides a constant force to the resilient disc stack assembly, whereas the other one is actuated in order to provide an additional biasing force on the rebound resilient disc stack. However, it should be appreciated again, that a similar effect can be achieved with one spring only for providing the additional biasing force to the resilient disc stack due to the actuator's operation. A geometric bias feature can be incorporated into the valve 44 in order to replace the spring 52 for providing the constant bias force to the resilient disc stack.

Also, all of the above exemplary embodiments reveal bi-stable solenoid configurations having the first stable position with the bias force that is higher than the second stable position. However, it should be appreciated again that a variation of the above concepts may feature the first stable position with a bias force that is lower than the bias force at the second stable position of the armature.

Obviously, many modifications and variations of the present invention are possible in light of the above teachings, including other bi-stable or latching devices, and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A shock absorber assembly including a fluid for absorbing forces between a first component and a second component comprising;
   a housing extending along an axis and presenting an open interior,
   a piston slidably disposed in said open interior of said housing and defining a compression chamber on one side of said piston and a rebound chamber on the other side of said piston,
   said piston presenting at least one aperture for conveying the fluid through said piston between said compression and rebound chambers,
   a valve including a resilient disc engaging said piston for impeding the passage of fluid through said aperture of said piston,
   a bi-stable solenoid disposed in said housing and interconnected with said valve and including an armature moveable between a first stable position maintained without the use of external energy for applying a first biasing force against said resilient disc of said valve and a second stable position maintained without the use of external energy for applying a second biasing force being less than said first biasing force against said resilient disc of said valve,
   a first core of a magnetic material and a second core of a magnetic material, and
   wherein said first position of said bi-stable solenoid is with said armature abutting said first core and said second position of said bi-stable solenoid is with said armature abutting said second core.

2. The assembly as set forth in claim 1 wherein said bi-stable solenoid is disposed in said compression chamber of said housing.

3. The assembly as set forth in claim 1 wherein said armature includes a permanent magnet for magnetically attracting said armature to said first and second cores.

4. The assembly as set forth in claim 3 further including a first armature spring for biasing said armature against said first core.

5. The assembly as set forth in claim 4 wherein said first armature spring extends between said armature and said second core.

6. The assembly as set forth in claim 4 further including a second armature spring for biasing said armature against said second core.

7. The assembly as set forth in claim 6 wherein said valve includes a first spring seat abutting said resilient disc and a second spring seat spaced from said piston and a valve spring extends between said first and second spring seats for biasing said first spring seat against said resilient disc and said piston.

8. The assembly as set forth in claim 7 further including a third spring seat interconnected with said armature and said second armature spring extending between said first spring seat and second third spring seat for biasing said armature against said second core and for biasing said first spring seat against said resilient disc and said piston.

9. A shock absorber assembly including a fluid for absorbing forces between a first component and a second component comprising;
   a housing extending along an axis and presenting an open interior,
   a piston slidably disposed in said open interior of said housing and defining a compression chamber on one side of said piston and a rebound chamber on the other side of said piston,
   said piston presenting at least one aperture for conveying the fluid through said piston between said compression and rebound chambers,
   a valve including a resilient disc engaging said piston for impeding the passage of fluid through said aperture of said piston,
   a bi-stable solenoid disposed in said housing and interconnected with said valve and including an armature moveable between a first stable position for applying a first biasing force against said resilient disc of said valve and a second stable position for applying a second biasing force being less than said first biasing force against said resilient disc of said valve,
   a first core of a magnetic material and a second core of a magnetic material and wherein said first position of said bi-stable solenoid is with said armature abutting said first core and said second position of said bi-stable solenoid is with said armature abutting said second core,
   said armature includes a permanent magnet for magnetically attracting said armature to said first and second cores,
   a first armature spring for biasing said armature against said first core, a second armature spring for biasing said armature against said second core, said valve includes a first spring seat abutting said resilient disc and a second spring seat spaced from said piston and a valve spring extends between said first and second spring seats for biasing said first spring seat against said resilient disc and said piston, a third spring seat interconnected with said armature and said second armature spring extending between said first spring seat and second third spring seat for biasing said armature against said second core and for biasing said first spring seat against said resilient disc and said piston, and a spindle extending from said armature to said third spring seat for moving said third spring seat in response to movement of said armature.

10. A shock absorber assembly including a fluid for absorbing forces between a first component and a second component comprising;

a housing extending along an axis and presenting an open interior, a piston slidably disposed in said open interior of said housing and defining a compression chamber on one side of said piston and a rebound chamber on the other side of said piston, said piston presenting at least one aperture for conveying the fluid through said piston between said compression and rebound chambers, a valve including a resilient disc engaging said piston for impeding the passage of fluid through said aperture of said piston, a bi-stable solenoid disposed in said housing and interconnected with said valve and including an armature moveable between a first stable position maintained without the use of external energy for applying a first biasing force against said resilient disc of said valve and a second stable position maintained without the use of external energy for applying a second biasing force being less than said first biasing force against said resilient disc of said valve, wherein said bi-stable solenoid is disposed in said rebound chamber of said housing, and wherein said valve is disposed in said compression chamber of said housing and further including a spindle extending through said piston to interconnect said bi-stable solenoid and said valve.

\* \* \* \* \*